United States Patent
Anderman

(10) Patent No.: US 6,364,252 B1
(45) Date of Patent: Apr. 2, 2002

(54) METHOD OF USING DWELL TIMES IN INTERMEDIATE ORBITS TO OPTIMIZE ORBITAL TRANSFERS AND METHOD AND APPARATUS FOR SATELLITE REPAIR

(75) Inventor: David Anderman, Laguna Woods, CA (US)

(73) Assignee: Constellation Services International, Inc., Woodland Hills, CA (US)

( * ) Notice: Subject to any disclaimer, the term of this patent is extended or adjusted under 35 U.S.C. 154(b) by 0 days.

(21) Appl. No.: 09/523,401

(22) Filed: Mar. 10, 2000

Related U.S. Application Data

(60) Provisional application No. 60/124,277, filed on Mar. 11, 1999.

(51) Int. Cl.$^7$ .................................. B64G 1/00
(52) U.S. Cl. .................................. 244/158 R
(58) Field of Search .............................. 244/164, 158 R, 244/169, 172

(56) References Cited

U.S. PATENT DOCUMENTS

| | | | |
|---|---|---|---|
| 4,754,601 A | * | 7/1988 | Minovitch |
| 4,872,015 A |   | 10/1989 | Rosen |
| 4,896,847 A | * | 1/1990 | Gertsch |
| 4,943,014 A | * | 7/1990 | Harwood et al. |
| 5,170,485 A |   | 12/1992 | Levine et al. |
| 5,199,672 A |   | 4/1993 | King et al. |
| 5,372,340 A | * | 12/1994 | Ihara et al. |
| 5,394,561 A |   | 2/1995 | Freeburg |
| 5,551,624 A |   | 9/1996 | Horstein et al. |
| 5,595,360 A | * | 1/1997 | Spitzer |
| 5,961,077 A | * | 10/1999 | Koppel et al. |
| 6,017,000 A | * | 1/2000 | Scott |
| 6,149,104 A | * | 11/2000 | Soranno |
| 6,182,928 B1 | * | 2/2001 | Wagner |

* cited by examiner

Primary Examiner—Michael J. Carone
Assistant Examiner—Tien Dinh
(74) Attorney, Agent, or Firm—Philip H. Albert; Townsend and Townsend and Crew LLP

(57) ABSTRACT

A reusable space vehicle docked in an intermediate orbit for rescue missions allows a satellite to be serviced with less delay, energy expenditure, and cost than a space vehicle launched from Earth for each mission. The reusable repair vehicle can be moved from one orbit to another with minimal energy expense while not having to wait for a launch window. Once a servicing need is identified, a destination orbit is identified for the space vehicle and a minimum energy path is identified. If the time to the next launch window between the docking orbit and the destination orbit happens to be near enough to allow for a timely rendezvous, the space vehicle is moved directly to the destination orbit. The space vehicle can be a vehicle designed to be piloted by humans or telerobotically. In one implementation, the inactive space vehicle is docked in an Intermediate LEO orbit (altitudes of approximately 250 km to approximately 500 km) and is used to rendezvous with objects in High LEO orbits (altitudes of approximately 500 km to approximately 1500 km) or objects in Low LEO orbits (altitudes of approximately 250 km or less). The space vehicle can be a modified lunar lander.

9 Claims, 3 Drawing Sheets

US 6,364,252 B1

METHOD OF USING DWELL TIMES IN INTERMEDIATE ORBITS TO OPTIMIZE ORBITAL TRANSFERS AND METHOD AND APPARATUS FOR SATELLITE REPAIR

This application claims priority from Provisional Application No. 60/124,277, filed Mar. 11, 1999.

BACKGROUND OF THE INVENTION

The present invention relates to orbital operations involving Earth satellites in general, and more particularly to an improved method and apparatus for rendezvousing with and/or servicing orbital platforms and satellites, or transporting material from one orbit to another.

There are many satellites in the range of altitudes generally referred to as Low Earth Orbit (LEO), particularly proximal to the lower reaches of the Van Allen belts. One preferred band of altitudes above the Earth's surface for LEO satellite operation is between 200 km (kilometers) and 1500 km in mid inclinations, or 200 km to 1000 km in polar inclinations.

LEO satellites may malfunction for a variety of reasons including, but not limited to, failure of booms or panels to deploy, computer or transponder failure, upper stage rocket failure, loss of orientation in relation to the sun and subsequent power loss, fundamental design flaws such as optical systems that can not focus properly or running out of fuel required for orbital station keeping or maneuvering. Currently, in most cases, a malfunctioning satellite is declared a complete loss and is replaced by a new satellite. This costs many tens of millions of dollars for commercial LEO satellites, hundreds of millions of dollars for commercial Geostationary Earth Orbit (GEO) satellites, and upwards of a billion dollars for many defense-related satellites. In addition to the cost of replacement there is also a delay caused by the need to build a replacement satellite.

In a few cases, the failure of some satellites has been remedied by in-orbit repair of the satellite or recapture of the satellite to Earth-bound repair and re-launch. In 1995, NASA used the Space Shuttle to repair faulty optics on the $1.5 billion Hubble Space Telescope. Using the Shuttle's robotic arm to grapple the Hubble telescope in its 600 kilometer altitude orbit, astronauts put on spacesuits, went out into space and replaced major sub-components of the Hubble system. Then, in 1997, NASA used the Shuttle to perform additional in-orbit repairs on the Hubble Space Telescope to fix failed inertial navigation sub-systems and to upgrade the Hubble Space Telescope with improved optics.

The use of the Space Shuttle for a repair mission, at an estimated mission cost of $500 million, is only practical and cost-effective for satellites with an existing value of at least half a billion dollars, and then only for satellites in orbits accessible by the Shuttle—from about 28.6 degrees inclination to 57 degrees inclination under normal circumstances, and under 650 kilometers altitude. With the current mix and positions of satellites in orbit today, that limits this repair scenario to less than one percent of the satellites in Earth orbit.

Direct launch from the Earth of satellite servicing apparatus, using space transportation vehicles other than the Shuttle, to the orbit occupied by a malfunctioning satellite has been proposed—but not implemented—by numerous parties. Direct launch from Earth of an apparatus that can recover or service a satellite is technically feasible, but expensive. Such a servicing approach might be useful in some cases, but the cost of launching the apparatus from Earth might well be more than the replacement cost of a satellite.

One issue for operations rendezvous in orbit is minimizing the cost and time of rendezvous. One factor that complicates rendezvous is the fact that orbits "precess" around the Earth (or other planetary bodies). A brief inspection of orbital mechanics shows why this is a problem. The path that an object takes in a closed-circuit orbit around a more massive body (such as a satellite around the Earth) is in the shape of an ellipse. If we consider a satellite's orbit around the Earth, the ellipse can be defined by its semimajor axis (a) given by Equation 1, $$a = \frac{h_A + h_P + 2R}{2} \quad \text{(Equ. 1)}$$

and eccentricity (e) given by Equation 2, $$e = \frac{h_A - h_P}{h_A + h_P + 2R} \quad \text{(Equ. 2)}$$

where R is the equatorial radius of the Earth, and $h_A$ and $h_P$ are the highest and lowest altitudes of the satellite above the Earth's surface, or "apogee" and "perigee", respectively. In the special case of a circular obit, $h_A = h_P$. The location of this ellipse in space relative to the Earth can be given by its inclination (i) relative to the equatorial plane, its right ascension of the ascending node (RAAN, or $\Omega$) which is measured counterclockwise in the equator plane from the direction of the vernal equinox to the point where the satellite makes its south-to-north crossing of the equatorial plane, and argument of perigee ($\omega$) which is measured in the orbit plane in the direction of the satellites motion from the ascending node to perigee. These relationships are shown in FIG. 1.

Westward precession of an orbit, taken herein to mean changes in the orbit's RAAN, will occur over time due to perturbations caused by $J_2$ zonal harmonics in the central attractive body's gravitational field ("oblateness"). Orbits of differing altitudes, inclinations, and eccentricity will exhibit different "precession rates" ($\dot\Omega$), which for an Earth orbit can be approximated by Equation 3.

$$\dot\Omega = \frac{-9.9639}{(1-e^2)^2} \times \left(\frac{R}{R + \frac{h_A + h_P}{2}}\right)^{3.5} \cos i \left[\frac{\text{degrees}}{\text{mean solar day}}\right] \quad \text{(Equ. 3)}$$

Orbital rendezvous, such as changing from one orbit to another of a different altitude, requires a change in velocity ($\Delta V$). The $\Delta V$ that can be achieved by expending a predetermined amount of energy, e.g., burning a predetermined amount of propellant in a rocket engine, where the predetermined amount can be calculated using Equation 4, $$\Delta V = g_0 I_{sp} \ln \frac{m_f + m_{fuel}}{m_f} \quad \text{(Equ. 4)}$$

where $g_0$ is the Earth's gravitational constant at sea level, $I_{SP}$ is the rocket engine's specific impulse, mf is the final mass of the space vehicle, and $m_{fuel}$ is the mass of the fuel used in the maneuver. Since $\Delta V$ is related to the amount propellant used, it thus affects the cost of the transfer.

Precession affects the cost of orbit transfer because changing from one orbit to another one in a different plane, i.e., one with a different inclination and/or RAAN, requires a certain $\Delta V$ even if those orbits are otherwise identical. For example, changing a circular orbit with velocity $V_C$ and inclination i from a RAAN of $\Omega_1$ to $\Omega_2$ will require a $\Delta V$ given by Equation 5, $$\Delta V = 2V_C \sin \theta/2 \qquad \text{(Equ. 5)}$$

where the equivalent plane change angle $\theta$ is given by Equation 6.

$$\cos \theta = \cos^2 i + \sin^2 \cos(\Omega_2 - \Omega_1) \qquad \text{(Equ. 6)}$$

By waiting for a specific orbit to precess to the same RAAN of another orbit, a minimum energy trip between the two orbits is available since no plane change is required. Conversely, reducing the waiting time needed to transfer from one orbit to another can be achieved by performing a transfer with some plane change, at the expense of extra $\Delta V$ required.

For missions launched from Earth into LEO, the relative precession rate between the launch site and the plane of an orbit in LEO is large (since the launch site on the Earth's surface rotates through 360 degrees in about one day) and hence the period between launch opportunities, or "windows", that can be made given the $\Delta V$ capability of the booster is measured in hours to a few days. For example, if a Delta rocket launch designed to emplace an Iridium satellite in a particular orbital plane is not launched on schedule, the next opportunity for launch presents itself within 24 hours. Therefore, precession rates have not presented a significant problem when traveling from Earth to LEO.

However, the relative precession rate between any two independent orbits in LEO is much smaller, and the corresponding periods between minimum energy windows is often in months or even years. For example, the relative precession rate between the MIR space station at (approximately) 400 km altitude and a Globalstar satellite at 1400 km is about 2 degrees per day with a period between minimum energy launch windows of 180 days. This has not been a problem until now because the need to move from one orbit in LEO to another orbit in LEO has been minimal. But a manned reusable space vehicle based at a space platform that was required to travel to a satellite in LEO to service or capture it will need to compromise between minimum time and cost needed to perform the mission.

SUMMARY OF THE INVENTION

Using a reusable space vehicle that is docked in an intermediate orbit for rescue missions according to one embodiment of the present invention, a satellite can be serviced with less delay, energy expenditure, and cost than a space vehicle launched from Earth for each mission. Additionally, if the reusable space vehicle is used for repairing or maintaining a plurality of satellites all orbiting at the same altitude, operating the space vehicle according to one method of the present invention, the reusable repair vehicle can be moved from one orbit to another with minimal energy expense while not having to wait for a launch window.

In one specific embodiment, the space vehicle is maintained in a docking orbit until needed. Once a servicing need is identified, a destination orbit is identified for the space vehicle and a minimum energy path is identified. If the time to the next launch window between the docking orbit and the destination orbit happens to be near enough to allow for a timely rendezvous, the space vehicle is simply moved directly to the destination orbit. However, if the next launch window is too far into the future, the space vehicle is first moved to an intermediate orbit for a dwell time and then moved to the destination orbit.

Preferably, the satellite will also be moved to an intermediate orbit during a launch window between the docking orbit and the intermediate orbit. The intermediate orbit might be specifically selected to give a particular launch window, i.e., the desired launch window can be identified and then the intermediate orbit selected from a plurality of intermediate orbits to select the orbit with the closest launch window to the desired launch window. The space vehicle remains in the intermediate orbit for a dwell time and after the dwell time, the space vehicle moves to the destination orbit.

The dwell time is preferably selected so that the launch window between the intermediate orbit and the destination orbit occurs at the end of the dwell time. Selecting the proper intermediate orbit and dwell time would allow the space vehicle to move from the docking orbit to the intermediate orbit to the destination orbit using only minimum energy launch windows (for each orbit change) in much less time than if the repair vehicle had to wait for a launch window between the docking orbit and the destination orbit.

Where the reusable space vehicle is used for "multi-hop" repair missions, the destination orbit for one hop could treated as the docking orbit for the next hop, with the docking orbit for the first hop and the destination orbit following the last repair preferably both being a docking orbit normally used by the space vehicle between missions.

The space vehicle can be a vehicle designed to be piloted by humans or telerobotically. In one implementation, the inactive space vehicle is docked in an Intermediate LEO orbit (altitudes of approximately 250 km to approximately 500 km) and is used to rendezvous with objects in High LEO orbits (altitudes of approximately 500 km to approximately 1500 km) or objects in Low LEO orbits (altitudes of approximately 250 km or less).

In one embodiment of a method for arranging a mission according to the present invention, the mission architecture includes a reusable orbital transfer vehicle. One step of the method is to station such a transfer vehicle at an orbital platform, whereat human pilots can be employed to pilot the vehicle. Because humans are involved in piloting the vehicle, transfer times are typically limited to a few days, rather than the weeks, months or years available to automatically piloted vehicles. Another step is to pilot, under human control, the transfer vehicle between target satellites in high Low Earth Orbit and consumables and payloads delivered extremely low earth orbit. In some variations of the method, the transfer vehicle will visit high LEO first, and then drop down to extremely low Earth orbit. In other variations, the transfer vehicle will visit low LEO first to pick up payloads and/or consumables and then, modifying its orbital precession by time management at low LEO, the transfer vehicle will rise up to high LEO for rendezvous with a target satellite.

Other variations of the method can be performed as described herein, to form a "triangle mission architecture" that allows transfer vehicle to be stored at an orbital platform between missions, with the orbital transfer vehicle returning to its 'home' platform. A triangle mission architecture, reduced mission durations allow them to be piloted by humans with less complexity. The triangle mission architecture also allows the transfer vehicle to move payloads between low LEO, high LEO and the orbital platform, wherever required, on a timely basis and allows the transfer vehicle to refuel at low altitudes where cost of fuel delivery is cheapest.

One advantage of these aspects of the present invention is that they facilitate quick, low energy transfers between orbits. One method of doing this is to manage the differences in precession rates by rendezvous targets and the space vehicle by having the space vehicle dwell in orbits with greater or lesser precession rates until the orbital plane of the next target for rendezvous, whether it is at the same inclination or at some other inclination in the GCI coordinate frame, is available for an optimum desired transfer orbit.

Another advantage is that the unique mission architecture encompassing the regression of different orbital altitudes greatly increases the cost benefit of a mission.

DESCRIPTION OF SPECIFIC EMBODIMENTS

Figure 1:
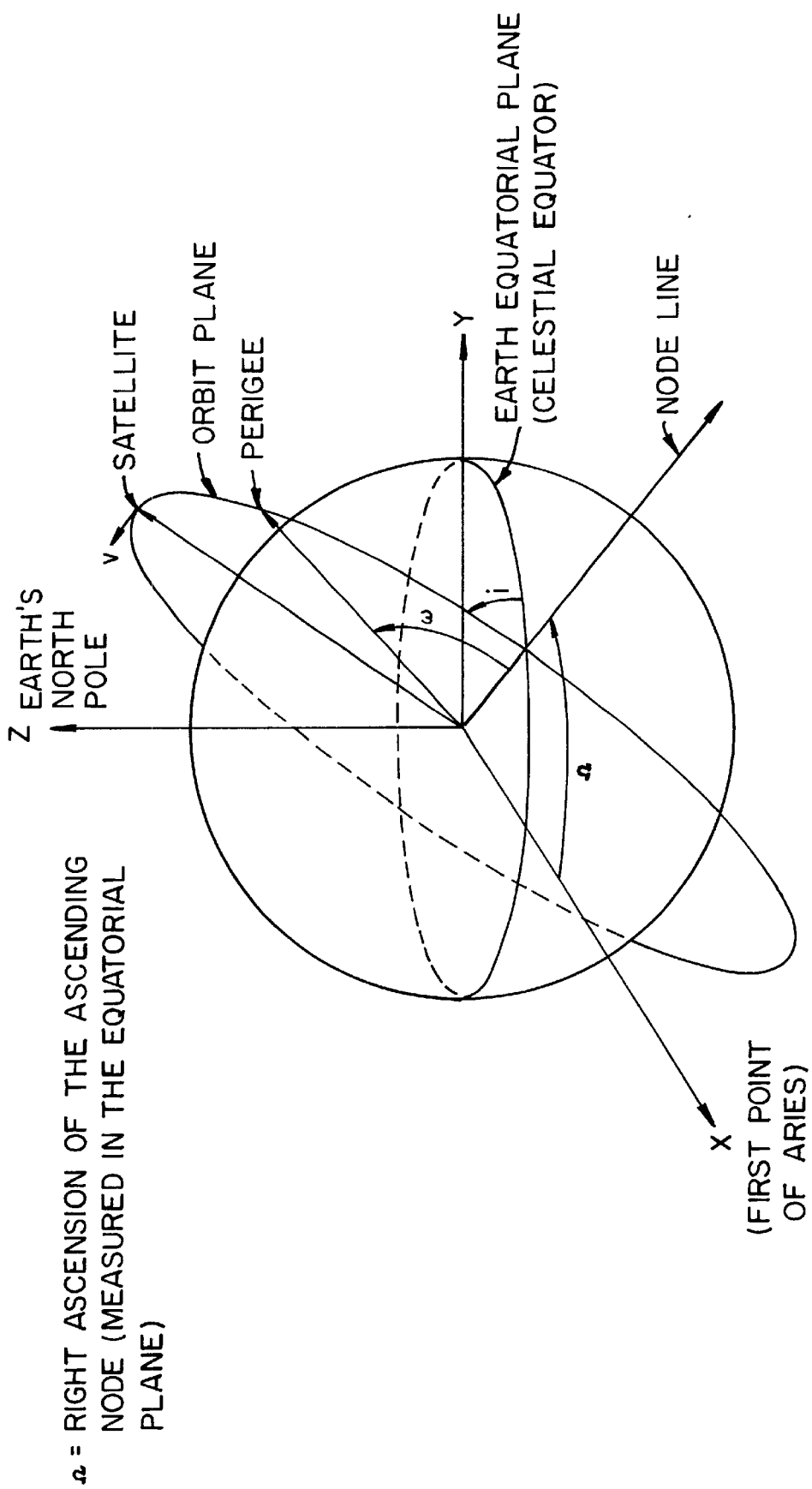
FIG. 1 is a diagram illustrating how various parameters of orbits are determined or used for setting and changing orbits.

Orbits around the Earth of differing altitudes, inclinations, and eccentricity will exhibit different "precession rates", which is taken herein to mean the rate at which the right ascension of the ascending node (RAAN) of an orbit's plane rotates in a geocentric inertial (GCI) coordinate frame, as shown in FIG. 1.

A space vehicle can be stored in a parking orbit and then can be raised to the appropriate higher orbit to service or recover a malfunctioning satellite. The space vehicle can be used for servicing malfunctioning satellites in their relatively high orbits, but might also be used to transport a satellite to another orbit. For example, a malfunctioning satellite might be towed from a High LEO orbit so that it can be picked up and returned to earth on a reentry vehicle, such as the Space Shuttle, that could not reach the High LEO orbit itself. The satellite might also be towed to a platform, such as the International Space Station, in an intermediate orbit for repair or storage, or transfer to another vehicle parked at the platform.

The vehicle can be a crewed orbital space vehicle based at an orbiting platform that would be reusable and refuelable and could be used for multiple sorties and a variety of orbital missions. As an example, such a vehicle could be based on the Russian T2K or LK orbital spacecraft.

Refueling could be accomplished via rendezvous and docking with a vehicle or platform carrying fuel that would be transferred using internal conduits or replaceable fuel tanks. The vehicle could be used for on-orbit assembly of space platforms or satellites in LEO, repair or retrieval of satellites, refueling of space platforms or satellites, or emplacement of payloads in higher or lower orbits using one or more of the methods described herein.

A space vehicle according to the present invention might also be used to transport supplies to a platform in LEO. The space vehicle could remain parked at the platform between supply sorties. The space vehicle would disengage from the platform and lower its orbit to meet with a space launch vehicle that has been launched from Earth and loaded with supplies for the platform, for the space vehicle itself, or payloads for other orbits. The space launch vehicle may be an expendable or reusable launch vehicle. The space vehicle may carry material from the platform, or from another orbit, to be transferred to the ground launched vehicle for subsequent return to Earth. The space vehicle can also be used to transport waste products from a space platform to low LEO for quick re-entry into Earth's atmosphere where the waste would be incinerated.

One benefit of such a system is that the equipment required to rendezvous and dock with the platform can be built into the space vehicle and used on repeated missions, as opposed to the technique of either: a) flying this equipment on expendable launch vehicles to be destroyed after one mission, or b) on reusable vehicles launched from Earth that suffer performance penalties on flights to relatively high orbits.

Using a vehicle according to the present invention is also a cost-effective method of facilitating on-orbit assembly of satellites or platforms in LEO. A crewed orbital space vehicle, based at an orbital platform, could help gather independently launched pieces of a satellite and provide access for human crews to complete assembly of the satellite or platform in orbit.

One method of operation involves the use of an intervening orbit in Low LEO to facilitate much quicker orbital plane changes between an Intermediate LEO orbit and a High LEO orbit to reach a target object, such as a malfunctioning satellite. If the orbital planes are well out of phase for a minimum energy orbit, and the time to the next window was longer than desired, the vehicle would be moved to low LEO, thereby accelerating the precession rate between the space vehicle's orbit and the orbit of the target object. Once an acceptable in phase condition is reached, the space vehicle would raise itself to High LEO and rendezvous with the target object. Subsequently, the space vehicle would face the same choice of waiting for a minimum energy window to go back to the platform in Intermediate LEO or moving to an intervening orbit to accelerate the precession rate to match up orbital planes.

This method can be combined to accomplish multiple missions in one round trip, which greatly increases the cost benefit of the mission. As used herein, this process might be referred to as a "triangle trade" mission. For example, the space vehicle could leave a platform in Intermediate LEO (ILEO), attain High LEO (HLEO) to rendezvous with a satellite that needs servicing, and subsequently drop its orbit down to Low LEO (LLEO) to rendezvous with a space launch vehicle to transfer the payload for a trip back to Earth and to pick up supplies. After such a transfer, the space vehicle would return to the platform in the intermediate orbit until the next mission opportunity.

Figure 2:
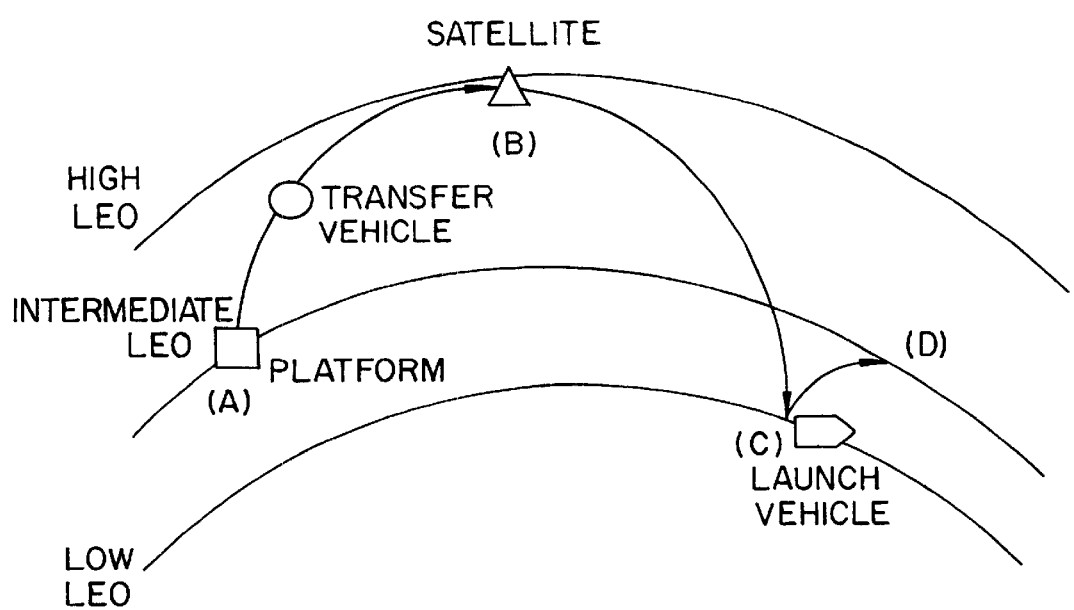
FIG. 2 is a diagram illustrating a first process of operating a space tug in a triangle trade mission.

An example of one such mission architecture is shown in FIG. 2, which demonstrates the vehicle parked at the platform in the intermediate orbit (A); rendezvousing at a HLEO orbit with a satellite that needs servicing (B); dropping to a LLEO orbit to rendezvous with a space launch vehicle (C), where the satellite or portions of it may be handed off, or the space vehicle may pick up supplies from the space launch vehicle, or both; and (D) return to the platform in the intermediate orbit (FIG. 2).

Because of the use of orbits around the Earth of differing altitudes by this mission architecture, the nodal precession rate of the space vehicle, the malfunctioning satellite, the platform in intermediate orbit, and the space launch vehicle will differ. "Nodal precession rate" is taken to mean herein as the rate at which the right ascension of the ascending node (RAAN) of an orbit's plane rotates in a geocentric inertial (GCI) coordinate frame. These differences are managed by using the differences in precession rates by the differing rendezvous targets for the space vehicle and having the space vehicle dwell in orbits with greater or lesser nodal precession rates until the orbital plane of the next target for rendezvous, whether it is at the same inclination or at some other inclination in the GCI coordinate frame, is available for a minimum energy transfer orbit, a minimum elapsed time transfer orbit, or some intermediate transfer orbit.

As an example, once the space vehicle leaves its normal parked position (A) for rendezvous with the malfunctioning object at the HLEO orbit (B), its orbit will experience a nodal precession rate lower than that of the platform in the original orbit. This precession rate difference means that the RAAN of the orbital plane of the space platform will move further to the west than that of the space vehicle in the same amount of time. However, by dropping its orbit to the extremely low Earth orbit (C), whether or not it is required to rendezvous with a space launch vehicle carrying supplies, the RAAN of the orbital plane of the space vehicle may catch up to that of the malfunctioning satellite, as the nodal precession rate of the extremely low Earth orbit is more than that of the platform in the intermediate orbit (D). By management of the dwell time at the extremely low Earth orbit, the orbital precession rate can be used as a variable in finding a desired orbital transfer solution that trades between minimum energy (minimum propellant) and minimum transfer time. Rendezvous with a space launch vehicle carrying supplies can be used to increase the economic benefit of this mission, and thus the use of the LLEO provides an benefit from more than just an orbital mechanics standpoint.

Figure 3:
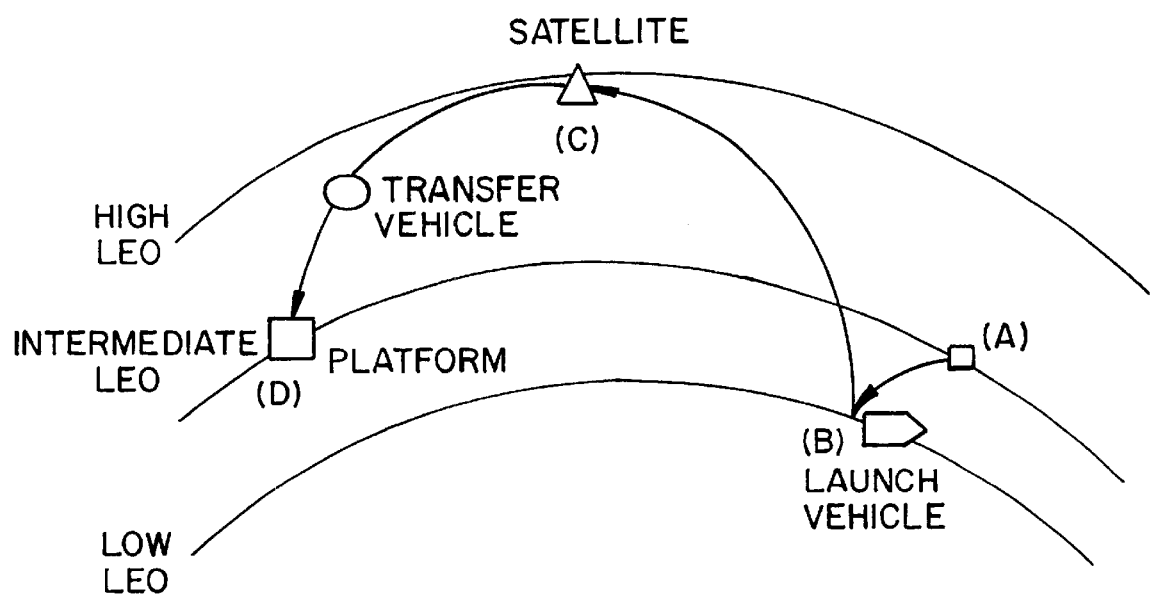
FIG. 3 is a diagram illustrating a second process of operating a space tug in a triangle trade mission.

It should be noted that the sequence of events noted above could be reversed as shown in FIG. 3, with the space vehicle leaving its parked position in the intermediate orbit (D), dropping down to pick up supplies and/or drop off a payload in LLEO (C), dwelling in this orbit until its orbital plane is sufficiently close to that of the target object in HLEO (B), and then raising its orbit for a fuel efficient rendezvous with the object in orbit (B), prior to return to its original position (A). In the event that additional time at HLEO (B) were required, the vehicle could drop to LLEO (C) to manage its orbital precession rate to coincide with that of the 'home' platform in the intermediate orbit.

In certain cases, the object in HLEO (B) could also use its internal fuel supply to lower its orbit to meet the space vehicle while reducing mission costs.

A space vehicle and a method of efficiently moving the space vehicle about are described above. If such a space vehicle is to be crewed, there are several requirements that should preferably be met by such a crewed space vehicle.

The vehicle should preferably be built to 1) carry humans safely for a minimum of several days, 2) to allow the crew to exit the vehicle in the vacuum of space to conduct extra-vehicular activities in orbit, and 3) to be capable of rendezvous and docking with other space objects. The vehicle should also be built with a weight, fuel capacity and engine efficiency that would allow the vehicle to achieve changes in orbital velocity of at least 2,000 meters per second and provide enough thrust to make these orbital changes in a day or less.

Building a custom vehicle from scratch to meet these requirements would be enormously expensive—on the order of a billion dollars. This has been the suggested approach in numerous studies by the military, NASA, and aerospace companies. For example, the Mar. 31, 1989 Comprehensive On-orbit Maintenance Assessment by the Air Force Systems Command (now Air Force Materiel Command) identified both a new orbital maneuvering vehicle for moving around within a designated orbit and docking with and servicing satellites, and an orbital transfer vehicle for moving things from LEO to higher orbits. The novel approach described herein is a significant improvement over beginning from scratch. In the novel approach, existing vehicles designed for other purposes are used in pursuit of the applications for a space vehicle that are described above. Three examples of such space vehicles are the US Apollo Lunar Lander, the Russian T2K Lunar Lander demonstration vehicle and Russian LK Lunar Lander that were derived from the Soyuz spacecraft series.

Some modifications would preferably be done to the lander in view of its new use a space transfer/maneuvering vehicle for rescue, repair, maintenance or other applications described herein. One modification is removal of the landing gear. The vehicle would rarely be landing in its role as a space tug, as it is typically "parked" in an intermediate orbit. Another modification is to replace the existing engines, which are designed to counterbalance lunar gravity in descent and take-off. Lighter, more efficient engines optimized for orbital transfers could be installed instead, since lunar gravity wells do not need to be surmounted by the space tug. Other modifications that might be made to such existing vehicles include upgrading the avionics, navigation, control, and communication equipment to current standards, upgrading to current standard docking ports to allow docking at a space station, and adding an on-orbit refueling port and a robotic arm.

The resulting vehicles would have a higher thrust-to-weight ratio and $\Delta V$ capability, once modified. However, in view of the new uses described herein for the vehicles, such modifications would be appropriate since the vehicles would not be used for the originally-designed purpose of manned lunar landing and take-off. While the need for some type of space repair vehicle has been described in the literature and discussed for decades, the modification of lunar vehicles as described above is an entirely new approach with many benefits and advantages.

A new space vehicle based on the somewhat obscure LK technologies (and/or the associated, and previously top-secret, T2K technologies) used by the Russians and modified as described herein would be very useful and economical, as the cost of building such a space vehicle is likely to be much less than a modified US Lunar Lander. One reason for this is the Russian aerospace industry has historically used effective but relatively simple designs and has historically been able to produce high-quality space equipment more inexpensively than elsewhere in the world. The LK/T2K was based on vehicles that are still in production—the Soyuz/Progress spacecraft product line. Also, LK/T2K design features such as its use of a single descent/ascent propulsion system would lend it to simple modifications such as removal of the landing legs that would not be needed for the space transfer/maneuvering vehicle mission, and the replacement of the original engine with a current Russian engine more suitable to the described mission. Additionally, its use of the Soyuz/Progress pressure shell structure would allow simple replacement of the original "Kontakt" docking system with the current Russian standard systems, which allow for pass-through of electrical power and propellants for refueling using current standard Russian refueling systems. This would also facilitate the upgrading of the avionics, navigation, control, and communication equipment to current Russian standards.

What is claimed is:

1. A lunar lander vehicle, modified to operate without a capability of landing on the lunar surface and modified to operate in a manned mission between a base orbit, a lower orbit lower than the base orbit and a higher orbit higher than the base orbit.

2. A method of operating a manned spacecraft comprising the steps of:

dropping from a base orbit to a lower orbit, wherein the lower orbit is lower than the base orbit;

remaining in the lower orbit for a first predetermined time;

rising to a higher orbit, wherein the higher orbit is higher than the base orbit;

remaining in the higher orbit for a second predetermined time; and returning to the base orbit.

3. The method of claim 2, further comprising a step of taking on cargo at the lower orbit during the first predetermined time.

4. The method of claim 3, wherein the cargo is supplies and repair material.

5. The method of claim 2, further comprising a step of performing repairs on a satellite in the higher orbit during the second predetermined time.

6. A method of operating a manned spacecraft comprising the steps of:

rising from a base orbit to a higher orbit, wherein the higher orbit is higher than the base orbit;

remaining in the higher orbit for a first predetermined time;

dropping to a lower orbit, wherein the lower orbit is lower than the base orbit;

remaining in the lower orbit for a second predetermined time; and returning to the base orbit.

7. The method of claim 6, further comprising a step of performing repairs on a satellite in the higher orbit during the first predetermined time.

8. The method of claim 6, further comprising a step of removing cargo from the manned spacecraft at the lower orbit during the second predetermined time.

9. The method of claim 8, wherein the cargo is repair material.

* * * * *